US006765891B2

(12) United States Patent
Laitinen et al.

(10) Patent No.: US 6,765,891 B2
(45) Date of Patent: Jul. 20, 2004

(54) METHOD AND APPARATUS PROVIDING FOR THE IMMEDIATE START OF 3G MEASUREMENTS IN DEDICATED MODE ON A CELL WITH A PACKET BROADCAST CONTROL CHANNEL

(75) Inventors: Pasi Laitinen, Oulu (FI); Hannu Huusko, Oulu (FI); Samuli Talvia, Turku (FI)

(73) Assignee: Nokia Corporation, Espoo (FI)

( * ) Notice: Subject to any disclaimer, the term of this patent is extended or adjusted under 35 U.S.C. 154(b) by 2 days.

(21) Appl. No.: 10/115,624

(22) Filed: Apr. 3, 2002

(65) Prior Publication Data

US 2003/0189912 A1 Oct. 9, 2003

(51) Int. Cl.[7] .................................................. H04Q 7/00
(52) U.S. Cl. ........................................ 370/331; 370/465
(58) Field of Search ................................. 370/328, 335, 370/342, 465, 331

(56) References Cited

U.S. PATENT DOCUMENTS

| | | | | | |
|---|---|---|---|---|---|
| 5,930,721 | A | * | 7/1999 | Fried et al. ................. | 455/466 |
| 6,058,302 | A | * | 5/2000 | Westerberg ................. | 455/411 |
| 6,424,637 | B1 | * | 7/2002 | Pecen et al. ................. | 370/328 |
| 6,546,251 | B1 | * | 4/2003 | Dalsgaard et al. .......... | 455/437 |
| 6,567,666 | B2 | * | 5/2003 | Czaja et al. ................. | 455/442 |

OTHER PUBLICATIONS

Separation of 3G information from PSI3ter into PSI3quater message, Jan. 15–19, 2001, 3GPP TSG–GERAN Meeting #3, Tdoc GP–010316, Agenda item 7.2.5.1, pp. 1–21.*
Wrong description of Bitmap type reporting in Packet Enhanced Measurement Report message, Jan. 15–19, 2002, 3GPP TSG–GERAN Meeting #09, Tdoc GP–021089, pp. 1–3.*

3rd Generation Partnership Project; Technical Specification Group GSM/EDGE Radio Access Network; Mobile radio interface layer 3 specification, Radio Resource Control Protocol (Release 1999); 3GPP TS 04.18, V8.13.0 (Feb. 2002).
3rd Generation Partnership Project; Technical Specification Group GSM/EDGE Radio Access Network; General Packet Radio Service (GPRS); Mobile Station (MS)—Base Station Systemn (BSS) interface, Radio Link Control/Medium Access Control (RLC/MAC) protocol (Release 1999); 3GPP TS 04.60, V8.13.0 (Feb. 2002).

* cited by examiner

Primary Examiner—Chi Pham
Assistant Examiner—Keith M. George
(74) Attorney, Agent, or Firm—Harrington & Smith, LLP

(57) ABSTRACT

A General Packet Radio Service GPRS, Global System for Mobile Communications GSM/Universal Mobile Telecommunications System UMTS mobile station (100) in accordance with these teachings includes a radio frequency transceiver (210,220) for communication with a wireless network (10) and a controller (120,180) responsive to a receipt of information from the wireless network for reporting 3G cells when operating in a GSM dedicated mode on a cell that has a Packet Broadcast Control Channel PBCCH. The controller is enabled to report the 3G cells before receipt of the 3G Neighbor Cell list from the MEASUREMENT INFORMATION message. The information includes a 3G Neighbor Cell list received in a PACKET SYSTEM INFORMATION Type 3quater message on the PBCCH, and a 3G_BA_IND information element received in the PACKET SYSTEM INFORMATION Type 3quater message. The controller reports the 3G cells using a MEASUREMENT REPORT message that reflects a value of the received 3G_BA_IND information element. In another embodiment a PSI3_CHANGE_MARK information element is received in the PACKET SYSTEM INFORMATION Type 3quater message, and the LSB of the PSI3_CHANGE_MARK information element is used by the mobile station as a 3G_BA_IND information element.

18 Claims, 2 Drawing Sheets

METHOD AND APPARATUS PROVIDING FOR THE IMMEDIATE START OF 3G MEASUREMENTS IN DEDICATED MODE ON A CELL WITH A PACKET BROADCAST CONTROL CHANNEL

TECHNICAL FIELD

These teachings relate generally to wireless communications systems and, more specifically, relate to cellular telecommunications of a type wherein dual-system and dual-mode mobile stations are required, when operating in one system, to make measurements from cells of the other system, such as Global System for Mobile Communications (GSM)/Universal Mobile Telecommunications System (UMTS) compatible mobile stations.

BACKGROUND

The following abbreviations are herewith defined.

| | |
|---|---|
| 3G | Third Generation (cellular system) |
| 3GPP | Third Generation Partnership Project |
| ARFCN | Absolute Radio Frequency Channel Number |
| BCCH | Broadcast Control Channel |
| BSC | Base Station Controller |
| BSS | Base Station System |
| BTS | Base Transceiver Station |
| CDMA | Code Division Multiple Access |
| DL | Down Link (to the MS) |
| FDD | Frequency Division Duplex |
| GPRS | General Packet Radio Service |
| GSM | Global System for Mobile Communications |
| HO | Handover |
| MS | Mobile Station |
| MSC | Mobile Switching Center |
| Multi-RAT | Multi-Radio Access Technology |
| PBCCH | Packet Broadcast Control Channel |
| PS | Packet Switched |
| SACCH | Slow Associated Control Channel |
| SGSN | Serving GPRS Support Node |
| TDD | Time Division Duplex |
| TS | Technical Specification |
| UL | Uplink (from the MS) |
| UMTS | Universal Mobile Telecommunications System |

Reference can also be made to 3GPP TR21.905, V4.4.0 (2001-10), Third Generation Partnership Project; Technical Specification Group Services and System Aspects; Vocabulary for 3GPP Specifications (Release 4).

A multi-RAT MS is one having both 2G (GSM) and 3G (UMTS) capabilities, i.e., a 2G–3G multimode MS that can obtain service in either a 2G or a 3G network.

In the GSM dedicated mode, that is during a circuit-switched (CS) connection, a GSM/UMTS multimode MS is required to measure and report the quality of surrounding 3G cells. This is done so that the wireless network is enabled to command, if necessary, the MS to perform a handover to a UMTS cell. The identifications of the 3G cells that the MS is required to monitor and report back to the wireless network are transmitted to the MS in a 3G Neighbor Cell list. In order to improve the overall system performance and reduce latency when handing over to a 3G cell it is important that the MS begin the measurement and reporting of 3G cells as soon as possible after entering the GSM dedicated mode, i.e., the MS preferably has immediate access to the 3G Neighbor Cell list.

When operating in the GSM dedicated mode the MS receives the 3G Neighbor Cell list as part of a MEASUREMENT INFORMATION message. As the amount of information carried in the MEASUREMENT INFORMATION message is substantial, the message contents are transmitted in several shorter message instances. As such, it requires some non-trivial amount of time for the MS to receive the 3G Neighbor Cell list from the MEASUREMENT INFORMATION message and to thereby have access to the 3 G Neighbor Cell list. To overcome this problem, i.e., to enable the MS to start the measurement and reporting of 3G cells immediately after entering the GSM dedicated mode, the 3G Neighbor Cell list that is used for the measurement and reporting of 3G cells in the GSM dedicated mode is also transmitted on a Broadcast Control Channel (BCCH) with a SYSTEM INFORMATION Type 2quater (SI2quater) message. This enables the MS to construct the 3G Neighbor Cell list, when operating in the idle mode, from the contents of SI2quater message, and to use the constructed list for the purpose of immediately beginning the measuring and reporting of 3G cells after entering the GSM dedicated mode.

While the use of the BCCH would at first glance appear to solve the problem of obtaining fast access to the 3G Neighbor Cell list, in actuality a General Packet Radio Service (GPRS) attached MS is not required to monitor the BCCH in the idle mode so long as the cell in which the MS is operating has a Packet Broadcast Control Channel (PBCCH). As a result, a GPRS-capable GSM/UMTS dual-mode MS that is monitoring the PBCCH, as opposed to the BCCH, is not able to construct the 3G Neighbor Cell list from the contents of SI2quater message.

It should be noted that the 3G Neighbor Cell list is also provided on the PBCCH with a PACKET SYSTEM INFORMATION Type 3quater (PSI3quater) message. This is done for the purpose of enabling the MS to measure and report 3G cells when operating in the GPRS packet idle and packet transfer modes. However, according to the current 3GPP technical specifications the MS is not allowed to use the 3G Neighbor Cell list that is constructed from the contents of the PSI3quater message for the measurement and reporting of 3G cells when in the GSM dedicated mode. Instead, the MS is expected to use the list constructed from the SI2quater message found on the BCCH. In fact, the 3G Neighbor Cell list constructed from the contents of PSI3quater message is not compatible with the MS messages used for measurement reporting in the GSM dedicated mode. As a consequence, a GPRS attached, GSM/UMTS dual-mode MS is not able to start the measurement and reporting of 3G cells in the GSM dedicated mode, when in a cell that has a PBCCH, before the 3G Neighbor Cell list is received from the MEASUREMENT INFORMATION message.

It can thus be clearly seen that the current state of the affairs is less than optimum for enabling an efficient and timely measuring and reporting of 3G cells by the dual mode GSM/UMTS MS, as the GPRS attached, GSM/UMTS dual-mode MS is unable to start the measurement and reporting of 3G cells, when operating in the GSM dedicated mode in a cell that has a PBCCH, before the lengthy MEASUREMENT INFORMATION message has been received. As a result, the call setup time is increased for the case of calls that are required to be transferred to UMTS before user data can be transferred (e.g., a video call requiring high bit rates provided only by UMTS).

SUMMARY OF THE PREFERRED EMBODIMENTS

The foregoing and other problems are overcome, and other advantages are realized, in accordance with the presently preferred embodiments of these teachings.

This invention provides a mechanism and an operating protocol for a GPRS attached, GSM/UMTS dual-mode MS to begin the measurement and reporting of 3G cells immediately after entering the GSM dedicated mode, in a cell that has a PBCCH, by enabling the 3G Neighbor Cell list received on the PBCCH to be also be used as initial information in the GSM dedicated mode, in a manner similar to the way in which the 3G Neighbor Cell list is used that is received from the BCCH.

A General Packet Radio Service GPRS, Global System for Mobile Communications GSM/Universal Mobile Telecommunications System UMTS capable mobile station in accordance with these teachings includes a radio frequency transceiver for communication with a wireless network and a controller responsive to a receipt of information from the wireless network for reporting 3G cells when operating in a GSM dedicated mode on a cell that has a Packet Broadcast Control Channel PBCCH. The controller is enabled to report the 3G cells before the receipt of the 3G Neighbor Cell list from the MEASUREMENT INFORMATION message. The information includes a 3G Neighbor Cell list received in a PACKET SYSTEM INFORMATION Type 3quater message on the PBCCH, and a 3G_BA_IND information element received in the PACKET SYSTEM INFORMATION Type 3quater message. The controller reports the 3G cells using a MEASUREMENT REPORT message that reflects a value of the received 3G_BA_IND information element. The controller may also report the 3G cells using an ENHANCED MEASUREMENT REPORT message that reflects a value of the received 3G_BA_IND information element.

In another embodiment a PSI3_CHANGE_MARK information element is received in the PACKET SYSTEM INFORMATION Type 3quater message, and the LSB of the PSI3_CHANGE_MARK information element is used by the mobile station as the 3G_BA_IND information element.

In general, the controller reports the 3G cells to the wireless network before a number of instances of the MEASUREMENT INFORMATION message are received that are defined by a 3G_WAIT parameter.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
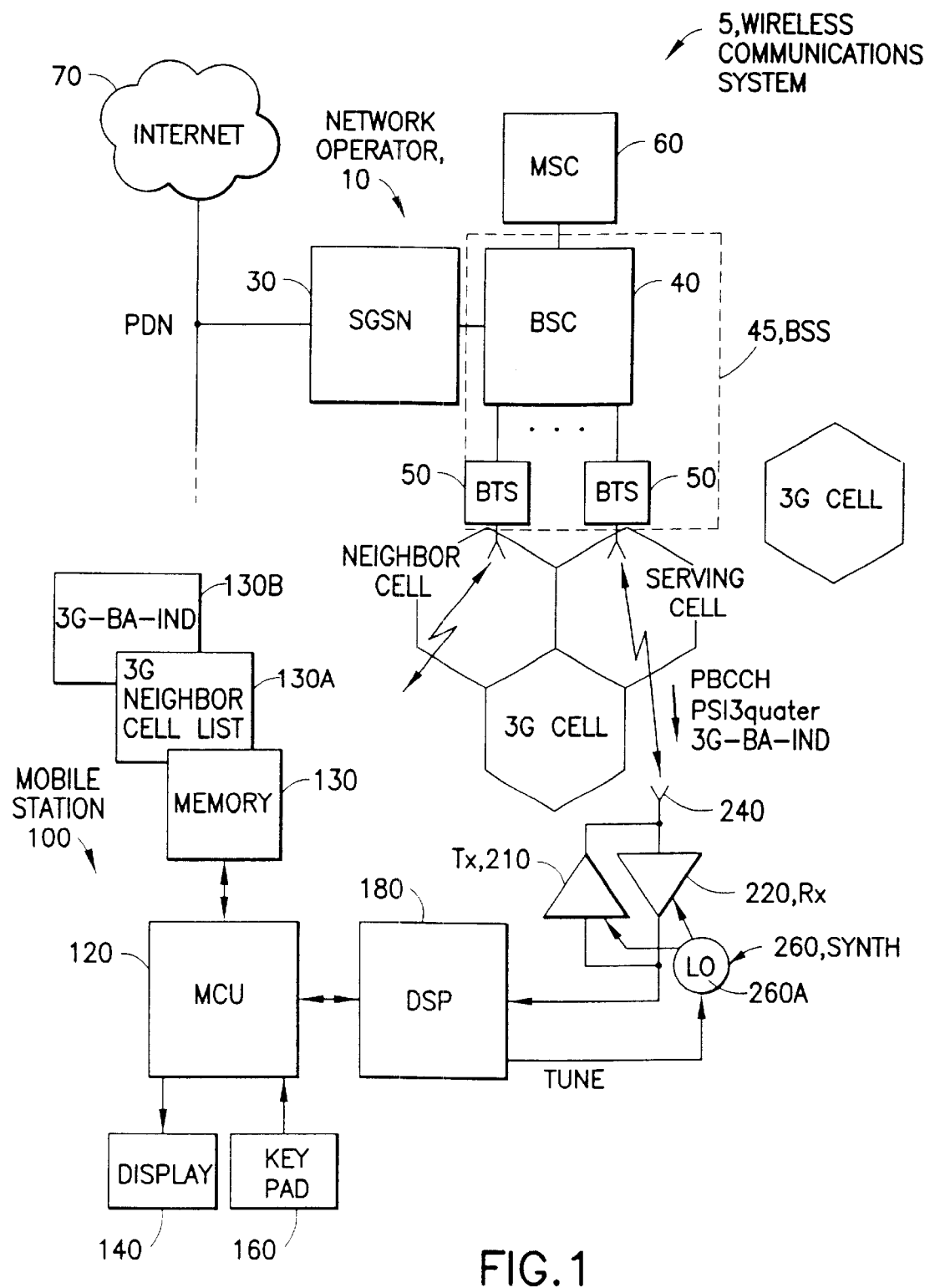
FIG. 1 is a block diagram of a wireless communications system and a mobile station that are suitable for practicing the teachings of this invention.

Referring first to FIG. 1, there is illustrated a simplified block diagram of an embodiment of a wireless communications system 5 that is suitable for practicing this invention. The wireless communications system 5 includes at least one mobile station (MS) 100. FIG. 1 also shows an exemplary network operator having, for example, a Serving GPRS Support Node (SGSN) 30 for connecting to a telecommunications network, such as a Public Packet Data Network or PDN, at and least one base station system (BSS) 45 containing a Base Station Controller (BSC) 40 and a plurality of base transceiver stations (BTS) 50 that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic.

The air interface standard can conform to any suitable standard or protocol, and may enable both voice and data traffic, such as data traffic enabling Internet 70 access and web page downloads. In the presently preferred embodiment of this invention the air interface standard is a Time Division Multiple Access (TDMA) air interface that supports a GSM or an advanced GSM protocol and air interface, although these teachings are not intended to be limited to TDMA or to GSM or GSM-related wireless systems. The network operator 10 may be assumed to also include a Mobile Switching Center (MSC) 60 for conducting CS voice communications.

For the purposes of this invention the MS 100 is assumed to be a dual mode GSM/UMTS MS, and to be compatible with GPRS. It is further assumed that there will exist some number of 3G cells that the MS 100 is expected to measure and report on when operating in the GSM dedicated mode, as was discussed above, and that the network 10 can command the MS 100 to handover to the UMTS when desired, such as when a call needs to be transferred to UMTS to accommodate a required bit rate for a user data transfer.

The mobile station 100 typically includes a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocol stacks that are required to operate with software routines, layers and protocol stacks in the network 10 so as to implement the methods in accordance with this invention. The ROM also includes software for providing overall control over the MS 100, as well as for providing a suitable user interface, via display 140 and keypad 160, with a user. Although not shown, a microphone and speaker are typically provided for enabling the user to conduct voice calls in a conventional manner.

The memory 130 is assumed, for the purposes of this invention, to provide storage for the 3G Neighbor Cell list 130A, that is decoded from the PBCCH by the MCU/DSP in accordance with the teachings of this invention. The network 10 is also assumed, for the purposes of this invention, to transmit a PSI3quater message as part of the PBCCH that is modified to include an information element referred to here as the 3G_BA_IND. The memory 130 thus also provides storage for storing the value of the 3G_BA_IND 130B. These aspects of the invention are described in greater detail below.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator (LO) 260 included in a frequency synthesizer is provided for tuning the transceiver over the frequency bands that enable GSM/UMTS operation. Data, such as digitized voice and packet data, as well as signaling information and messages, are transmitted and received through the antenna 240.

In accordance with this invention the GPRS attached, GSM/UMTS dual-mode MS 100 is enabled to start the measurement and reporting to the network 10 of the 3G cells immediately after entering the GSM dedicated mode in a cell that has a PBCCH. In practice this implies that the network 10 is able to command the MS 100 to perform a handover to UMTS earlier than would be possible otherwise.

In accordance with an aspect of this invention the MS 100 is enabled to use the 3G Neighbor Cell list 130A that is received in a PSI3quater message on the PBCCH as initial information when in the GSM dedicated mode, in a manner similar to the 3G Neighbor Cell list received in a SI2quater message from the BCCH.

This aspect of the invention actually has two related and interacting parts or steps. First, the MS 100 uses the 3G Neighbor Cell list 130A received on the PBCCH as the initial information in the GSM dedicated mode and, second, the 3G Neighbor Cell list received on the PBCCH is made compatible with the measurement reporting messages used in the GSM dedicated mode (i.e., the MEASUREMENT REPORT and ENHANCED MEASUREMENT REPORT messages).

In the presently preferred embodiment the first step involves changes to the 3GPP TS 04.18 v8.13.0 specification, as discussed in detail below, while the second step involves changes to the 3GPP TS 04.60 v8.13.0 specification, and adds the 3G_BA_IND field to the PSI3quater message. The 3G Neighbor Cell list is identified by the 3G_BA_IND field in measurement reporting messages transmitted by the MS 100 to the network 10 in the GSM dedicated mode.

Referring to the first step, and to the modifications to the 3GPP TS 04.18 v8.13.0 specification referred to above, more specifically Section 3.4.1.2.1, "Parameters for Measurements and Reporting", the parameters from the Measurement Information or SI2quater, as well as the PSI3quater messages in accordance with this invention, allow the building of lists that are used for Measurement reporting and Enhanced Measurement reporting. A full set, i.e., all instances of the MEASUREMENT INFORMATION messages (respectively: SI2quater) is defined by a number of different instances indicated by the parameter MI_COUNT (respectively SI2quater_COUNT). Two different instances of MEASUREMENT INFORMATION (respectively: SI2quater) messages are two MEASUREMENT INFORMATION (respectively: SI2quater messages with different MI_INDEX (respectively: SI2quater_INDEX) parameter values.

In the Idle mode, on a cell without a PBCCH allocated, a multi-RAT MS 100 reads and decodes a full set of SI2quater messages to form the 3G Neighbor Cell list 130A. When the 3G_BA_IND parameter is changed in the Idle mode, the MS 100 re-reads all instances and rebuilds the 3G Neighbor Cell list 130A.

In accordance with the teachings of this invention, on a cell with PBCCH allocated, a GPRS attached multi-RAT MS 100 constructs the 3G Neighbor Cell list 130A from PSI3quater messages to form the 3G Neighbor Cell list 130A.

The 3G Neighbor Cell list 130A, whether constructed from the SI2quater or PSI3quater messages, is then used for reporting when the MS 100 enters the dedicated mode, until the MS 100 has received a given number of instances of MEASUREMENT INFORMATION messages that contain the 3G Neighbor Cell description. The number of message instances is defined by the 3G-WAIT parameter. When the 3G_BA_IND parameter is changed when on the SACCH, the MS 100 re-reads all instances and rebuilds the 3G Neighbor Cell list 130A, and uses the new list for reporting based on the 3G-WAIT parameter.

The remaining portion of Section 3.4.1.2.1, "Parameters for Measurements and Reporting", can be practiced as currently specified.

Section 3.4.1.2.1.1 of the 3GPP TS 04.18 v8.13.0 specification, "Deriving the 3G Neighbor Cell list from the 3G Neighbor Cell Description", is modified as follows (this applies only to a multi-RAT MS 100). One or more instances of the Measurement Information message, or the SI2quater message, or, in accordance with this invention, the PSI3quater message may provide the 3G Neighbor Cell Description information and is used to build the 3G Neighbor Cell list 130A. As currently specified the 3G Neighbor Cell list may contain up to 96 3G Neighbor Cells.

With specific regard to building the 3G Neighbor Cell list, each 3G Neighbor Cell Description received is added to the 3G Neighbor Cell list, starting with the index equal to the parameter Index_Start_3G. If this parameter is not present then the value 0 is used in its place.

For each 3G Neighbor Cell Description, the cells are indexed in the 3G Neighbor Cell list 130A in the following order:

1) UTRAN FDD cells: FDD ARFCNs are indexed in the order of occurrence in the 3G Neighbor Cell description. Then for each FDD ARFCN, the cells are indexed in the order of increasing values of the decoded FDD_CELL_INFORMATION parameters.

2) UTRAN TDD cells: TDD ARFCNs are indexed in the order of occurrence in the 3G Neighbor Cell description. Then for each TDD ARFCN, the cells are indexed in the order of increasing values of the decoded TDD_CELL_INFORMATION parameters.

3) CDMA 2000 cells: The cells are indexed in the order of occurrence in the 3G Neighbor Cell description.

Turning now to the second step referred to above, changes are made to the 3GPP TS 04.60 v8.13.0 specification in order to add the above-referenced 3G_BA_IND field to the PSI3quater message. The 3G Neighbor Cell list is identified by the 3G_BA_IND field in measurement reporting messages used by the MS 100 when operating in the GSM dedicated mode.

Section 5.6.3 of the 3GPP TS 04.60 v8.13.0 specification, "Additional measurement and reporting parameters", states that some parameters from the PACKET MEASUREMENT ORDER, PACKET CELL CHANGE ORDER, SI2quater, PSI3bis, PSI3ter, PSI3quater or PSI5 messages allow for building the GPRS Measurement Parameters, GPRS 3G Measurement Parameters and neighbor cell lists used for Network Control (NC) measurement reporting.

Section 5.6.3.1, "Deriving the 3G Neighbor Cell list from the 3G Neighbor Cell description", states that in a cell without a PBCCH allocated, the 3G Neighbor Cell list is given by one or more instances of the SI2quater message with the same 3G_BA_ND value. In a cell with a PBCCH allocated, the 3G Neighbor Cell list is given by one or more instances of the PSI3quater message with the same PSI3_CHANGE_MARK value and, in accordance with this aspect of the invention, 3G_BA_ND value.

In a cell without a PBCCH allocated, the MS 100 only combines 3G Neighbor cells from SI2quater messages that indicate the same value of the 3G_BA_IND, without any message indicating a different value of the 3G_BA_IND received in between.

In a cell with a PBCCH allocated, the MS 100 only combines 3G Neighbor cells from PSI3quater messages indicating the same PSI3_CHANGE_MARK value and, in accordance with this aspect of the invention, the same 3G_BA_IND value.

Further in accordance with this invention a modification is made to the PSI3quater message content to support the foregoing modifications and enhancements to the current standards and specifications. More specifically, the Section 1.2.21b "Packet System Information Type 3 quater", describes the PSI3quater message as follows. This message is sent by the network 10 on the PBCCH or PACCH for giving information regarding 3G Neighbor Cells and additional measurement and reporting parameters. If not all information fits into one instance of the PSI3quater message, the PSI3quater message can be repeated. Certain special requirements for the transmission of this message apply on the PBCCH, and are described in 3GPP TS 05.02.

Table 11.2.21b.1 gives the PSI3quater information elements.
<PSI3 quater message content>::=
,<PAGE_MODE : bit (2)>
,<PSI3_CHANGE_MARK: bit (2)>
,<PSI3_QUATER_INDEX : bit (4)>
,<PSI3_QUATER_COUNT : bit (4)>

In accordance with this invention the PSI3 quater message content is modified to add a one bit field:
<3G_BA_IND:bit>,
which, in the presently preferred but non-limiting embodiment, is inserted after the PSI3_CHANGE_MARK field.

The Table 11.2.21b.2 gives the details of the PSI3quater information elements, and is modified to include the 3G_BA_ND (1 bit field) description. The 3G_BA_IND is needed to identify a set of 3G Neighbor Cell information used for MS 100 reporting in the dedicated mode. The value received by the MS 100 is then reflected in the MEASUREMENT REPORT and ENHANCED MEASUREMENT REPORT message, as was described above with regard to 3GPP TS 04.18 Section 3.4.1.2.1, "Parameters for Measurements and Reporting".

The 3G_BA_ND parameter has been specified above to be a 1-bit field. The values of the 3G_BA_IND in the PSI3quater message and in the SI2quater message are preferably equal so that the 3G Neighbor Cell list received on the BCCH/PBCCH can be unambiguously distinguished from the 3G Neighbor Cell list provided on the SACCH, i.e., in the MEASUREMENT INFORMATION message. Note that the network 10 does not know whether the MS 100 has decoded the initial 3G Neighbor Cell list from the BCCH or from the PBCCH.

Note, however, that since the MS 100 is not required to decode both BCCH and PBCCH, the 3G Neighbor Cell list received in the Idle/packet Idle mode can be readily distinguished from the 3G Neighbor Cell list provided with the MEASUREMENT INFORMATION message. If, however, the 3G Neighbor Cell list given on the BCCH is required to be distinguished from the 3G Neighbor Cell list given on PBCCH, the 3G_BA_IND field can be expanded to be two or more bits, thereby enabling additional information to be specified. This change would require changes to following messages: SI2quater, PSI3quater, MEASUREMENT REPORT, ENHANCED MEASUREMENT REPORT, MEASUREMENT INFORMATION, PACKET MEASUREMENT REPORT, PACKET ENHANCED MEASUREMENT REPORT, PACKET CELL CHANGE ORDER and PACKET MEASUREMENT ORDER to accommodate the use of more than one bit for the 3G_BA_IND field.

In accordance with a further embodiment of this invention a modification to the PSI3quater message is avoided. More particularly, Section 5.6.3.1 as currently specified states that in a cell with a PBCCH allocated the MS 100 only combines 3G Neighbor cells from PSI3quater messages that indicate the same PSI3_CHANGE_MARK value. In accordance with this embodiment of the invention, for use in reporting 3G cells in the dedicated mode, the MS 100 converts the least significant bit (LSB) of the 2-bit PSI3_CHANGE_MARK field to the one bit 3G_BA_IND, and uses this value when reporting 3G cells with the MEASUREMENT REPORT or ENHANCED MEASUREMENT REPORT messages.

Figure 2:
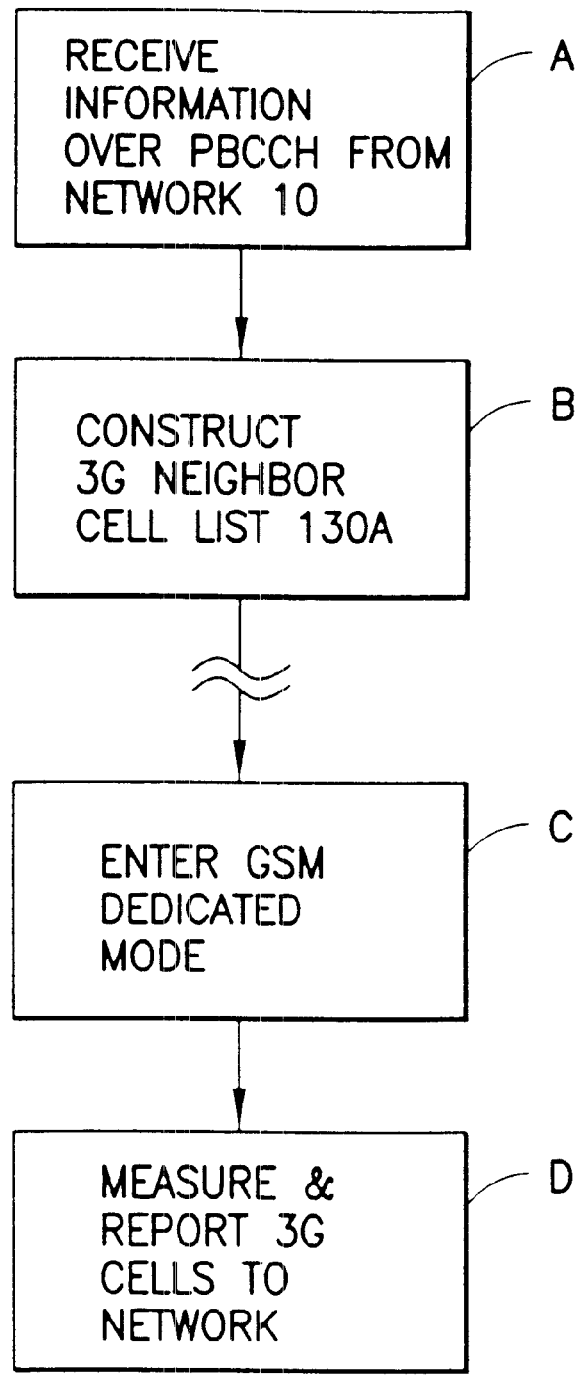
FIG. 2 is a logic flow diagram in accordance with a method of this invention.

Referring to FIG. 2, it can be appreciated that an aspect of this invention is providing a method for operating the GPRS attached, GSM/UMTS capable mobile station 100. The method includes, at Block A, receiving information from the wireless network 10 over the PBCCH; at Block B, constructing the 3G Neighbor Cell list from the received information; at Block C; entering the GSM dedicated mode of operation; and at Block D, measuring and reporting 3G cells to the wireless network 10 using the 3G Neighbor Cell list, before receiving the 3G Neighbor Cell list from the MEASUREMENT INFORMATION message transmitted by the network 10.

The received information is contained in a PACKET SYSTEM INFORMATION Type 3quater message sent on the PBCCH. In one embodiment a 3G_BA_IND information element is added to and received in the PACKET SYSTEM INFORMATION Type 3quater message. In another embodiment the MS 100 interprets the LSB of the already existent PSI3_CHANGE_MARK field as the 3G_BA_IND information element field.

Block D, where the MS 100 reports the 3G cells, uses a MEASUREMENT REPORT message that reflects a value of the received 3G_BA_IND information element. The MS 100 may also report the 3G cells using an ENHANCED MEASUREMENT REPORT message that reflects a value of the received 3G_BA_ND information element.

While described in the context of presently preferred embodiments of this invention, those skilled in the art should appreciate that changes in form and details may be made, and that these changes will still fall within the teachings of this invention. For example, the message format and numbers of bits of certain information element fields could be varied from those disclosed above, and so long as both the wireless network 10 and the mobile station 100 are aware of the changes, then this invention can be practiced.

What is claimed is:

1. A General Packet Radio Service GPRS, Global System for Mobile Communications GSM/Universal Mobile Telecommunications System UMTS mobile station comprising a radio frequency transceiver for communication with a wireless network, said mobile station comprising a controller responsive to a receipt of information from said wireless network for reporting 3G cells when operating in a GSM dedicated mode on a cell that has a Packet Broadcast Control Channel PBCCH, said controller reporting before receipt of the 3G Neighbor Cell list from the MEASUREMENT INFORMATION message, where said information comprises a 3G Neighbor Cell list received in a PACKET SYSTEM INFORMATION Type 3quater message on the PBCCH, and a 3G BA IND_information element received in the PACKET SYSTEM INFORMATION Type 3quater message.

2. A GPRS, GSM/UMTS mobile station as in claim 1, where said controller reports said 3G cells using a MEASUREMENT REPORT message that reflects a value of the received 3G_BA_IND information element.

3. A GPRS, GSM/UMTS mobile station as in claim 1, where said controller reports said 3G cells using an ENHANCED MEASUREMENT REPORT message that reflects a value of the received 3G_BA_IND information element.

4. A GPRS, GSM/UMTS mobile station as in claim 1, where said information comprises a 3G Neighbor Cell list received in a PACKET SYSTEM INFORMATION Type 3quater message on the PBCCH, and further comprises the LSB of a PSI3_CHANGE_MARK information element received in the PACKET SYSTEM INFORMATION Type 3quater message, the LSB of the PSI3_CHANGE_MARK information element being used by said controller as a 3G_BA_IND information element.

5. A GPRS, GSM/UMTS mobile station as in claim 4, where said controller reports said 3G cells using a MEASUREMENT REPORT message that reflects a value of the 3G_BA_IND information element.

6. A GPRS, GSM/UMTS mobile station as in claim 4, where said controller reports said 3G cells using an ENHANCED MEASUREMENT REPORT message that reflects a value of the 3G_BA_IND information element.

7. General Packet Radio Service GPRS, Global System for Mobile Communications GSM/Universal Mobile Telecommunications System UMTS mobile station comprising a radio frequency transceiver for communication with a wireless network, said mobile station comprising a controller responsive to a receipt of information from said wireless network for reporting 3G cells when operating in a GSM dedicated mode on a cell that has a Packet Broadcast Control Channel PBCCH, said controller reporting before receipt of the 3G Neighbor Cell list from the MEASUREMENT INFORMATION message, where said controller reports before a number of instances of the MEASUREMENT INFORMATION message are received that is defined by a 3G_WAIT parameter.

8. A wireless network for operation with a General Packet Radio Service GPRS, Global System for Mobile Communications GSM/Universal Mobile Telecommunications System UMTS mobile station, said wireless network comprising a radio frequency transceiver for communication with said mobile station, said wireless network comprising a controller for sending through said transceiver a MEASUREMENT INFORMATION message, a Broadcast Control Channel (BCCH) containing a SYSTEM INFORMATION Type 2quater (SI2quater) message, both for use in constructing a 3G Neighbor Cell list, said controller further sending a Packet Broadcast Control Channel PBCCH comprising a PACKET SYSTEM INFORMATION Type 3quater message for use in constructing the 3G Neighbor Cell list, as well as a related 3G_BA_ND information element, said controller being responsive to a receipt from said mobile station of a MEASUREMENT REPORT message or an ENHANCED MEASUREMENT REPORT message for reporting 3G cells when operating in a GSM dedicated mode, said MEASUREMENT REPORT message or ENHANCED MEASUREMENT REPORT message being received from said mobile station prior to said mobile station constructing a complete 3G Neighbor Cell list from received MEASUREMENT INFORMATION.

9. A wireless network as in claim 8, where the MEASUREMENT REPORT message received by said controller reflects a value of the 3G_BA_IND information element.

10. A wireless network for operation with a General Packet Radio Service GPRS, Global System for Mobile Communications GSM/Universal Mobile Telecommunications System UMTS mobile station, said wireless network comprising a radio frequency transceiver for communication with said mobile station, said wireless network comprising a controller for sending through said transceiver a MEASUREMENT INFORMATION message, a Broadcast Control Channel (BCCH) containing a SYSTEM INFORMATION Type 2quater (SI2quater) message, both for use in constructing a 3G Neighbor Cell list, said controller further sending a Packet Broadcast Control Channel PBCCH comprising a PACKET SYSTEM INFORMATION Type 3quater message for use in constructing the 3G Neighbor Cell list, as well as a related 3G_BA_IND information element, said controller being responsive to a receipt from said mobile station of a MEASUREMENT REPORT message or an ENHANCED MEASUREMENT REPORT message for reporting 3G cells when operating in a GSM dedicated mode, said MEASUREMENT REPORT message or ENHANCED MEASUREMENT REPORT message being received from said mobile station prior to said mobile station constructing a complete 3G Neighbor Cell list from received MEASUREMENT INFORMATION, where said controller receives a report of 3G cells prior to said mobile station receiving a number of instances of the MEASUREMENT INFORMATION message that is defined by a 3G_WAIT parameter.

11. A wireless network for operation with a General Packet Radio Service GPRS, Global System for Mobile Communications GSM/Universal Mobile Telecommunications System UMTS mobile station, said wireless network comprising a radio frequency transceiver for communication with said mobile station, said wireless network comprising a controller for sending through said transceiver a MEASUREMENT INFORMATION message, a Broadcast Control Channel (BCCH) containing a SYSTEM INFORMATION Type 2quater (SI2quater) message, both for use in constructing a 3G Neighbor Cell list, said controller further sending a Packet Broadcast Control Channel PBCCH comprising a PACKET SYSTEM INFORMATION Type 3quater message for use in constructing the 3G Neighbor Cell list, the PACKET SYSTEM INFORMATION Type 3quater message comprising a PSI3_CHANGE_MARK information element, said controller being responsive to a receipt from said mobile station of a MEASUREMENT REPORT message or an ENHANCED MEASUREMENT REPORT message for reporting 3G cells when operating in a GSM dedicated mode, said MEASUREMENT REPORT message or ENHANCED MEASUREMENT REPORT message being received from said mobile station prior to said mobile station constructing a complete 3G Neighbor Cell list from received MEASUREMENT INFORMATION, where the value of the LSB of the PSI3_CHANGE_MARK information element is reported back to said controller as a 3G_BA_IND information element.

12. A method for operating a General Packet Radio Service GPRS, Global System for Mobile Communications GSM/Universal Mobile Telecommunications System UMTS mobile station, comprising:

receiving information from a wireless network over a Packet Broadcast Control Channel (PBCCH);

constructing a 3G Neighbor Cell list from the received information; and after entering a GSM dedicated mode of operation, reporting 3G cells to the wireless network using the 3G Neighbor Cell list, before receipt of the 3G Neighbor Cell list from a MEASUREMENT INFORMATION message transmitted by the wireless network;

where said information is contained in a PACKET SYSTEM INFORMATION Type 3quater message sent on the PBCCH, and a 3G_BA_IND information element received in the PACKET SYSTEM INFORMATION Type 3quater message.

13. A method as in claim 12, where reporting reports said 3G cells using a MEASUREMENT REPORT message that reflects a value of the received 3G_BA_IND information element.

14. A method as in claim 12, where reporting reports said 3G cells using an ENHANCED MEASUREMENT REPORT message that reflects a value of the received 3G_BA_IND information element.

15. A method as in claim 12, where said information comprises a 3G Neighbor Cell list received in a PACKET SYSTEM INFORMATION Type 3quater message on the PBCCH, and further comprises the LSB of a PSI3_CHANGE_MARK information element received in the PACKET SYSTEM INFORMATION Type 3quater message, the LSB of the PSI3_CHANGE_MARK information element being used a 3G_BA_IND information element.

16. A method as in claim 15, where reporting reports said 3G cells using a MEASUREMENT REPORT message that reflects a value of the 3G_BA_IND information element.

17. A method as in claim 15, where reporting reports said 3G cells using an ENHANCED MEASUREMENT REPORT message that reflects a value of the 3G_BA_IND information element.

18. A method for operating a General Packet Radio Service GPRS, Global System for Mobile Communications GSM/Universal Mobile Telecommunications System UMTS mobile station, comprising:

receiving information from a wireless network over a Packet Broadcast Control Channel (PBCCH);

constructing a 3G Neighbor Cell list from the received information; and after entering a GSM dedicated mode of operation, reporting 3G cells to the wireless network using the 3G Neighbor Cell list, before receipt of the 3G Neighbor Cell list from a MEASUREMENT INFORMATION message transmitted by the wireless network;

where said information is contained in a PACKET SYSTEM INFORMATION Type 3quater message sent on the PBCCH, and a 3G_BA_IND information element received in the PACKET SYSTEM INFORMATION Type 3quater message, where reporting occurs before said mobile station receives a number of instances of the MEASUREMENT INFORMATION message that is defined by a 3G_WAIT parameter.

* * * * *